(12) United States Patent
Leak

(10) Patent No.: US 6,901,456 B1
(45) Date of Patent: May 31, 2005

(54) METHOD AND SYSTEM FOR SCSI HOST BUS INTERCONNECTION

(75) Inventor: Daniel Leak, Wichita, KS (US)

(73) Assignee: LSI Logic Corporation, Milpitas, CA (US)

( * ) Notice: Subject to any disclaimer, the term of this patent is extended or adjusted under 35 U.S.C. 154(b) by 735 days.

(21) Appl. No.: 09/336,649

(22) Filed: Jun. 18, 1999

(51) Int. Cl.$^7$ ............................................. G06F 13/00
(52) U.S. Cl. ........................ 710/9; 710/2; 710/3; 710/8; 710/300
(58) Field of Search .......................... 710/8, 9, 14, 300, 710/305, 2, 3, 74, 104, 306

(56) References Cited

U.S. PATENT DOCUMENTS

| | | | |
|---|---|---|---|
| 4,604,689 A | | 8/1986 | Burger |
| 5,283,872 A | | 2/1994 | Ohnishi ...................... 710/311 |
| 5,454,085 A | * | 9/1995 | Gajjar et al. ................. 710/105 |
| 5,495,584 A | | 2/1996 | Holman et al. |
| 5,522,050 A | | 5/1996 | Amini et al. |
| 5,615,345 A | | 3/1997 | Wanger |
| 5,682,484 A | | 10/1997 | Lambrecht |
| 5,740,466 A | | 4/1998 | Geldman et al. |
| 5,758,109 A | | 5/1998 | Gafford et al. |
| 6,009,275 A | * | 12/1999 | DeKoning et al. ........... 395/727 |
| 6,021,454 A | * | 2/2000 | Gibson ........................ 710/129 |
| 6,055,582 A | * | 4/2000 | Pascarella et al. ............ 710/14 |
| 6,078,979 A | * | 6/2000 | Li et al. ...................... 710/129 |

OTHER PUBLICATIONS

IBM Technical Disclosure Bulletin, SCSI Switch for Redundant Arrays, Nov. 1991, vol. 34, Issue 6, pp. 342–343.*

* cited by examiner

*Primary Examiner*—Ilwoo Park
(74) *Attorney, Agent, or Firm*—Suiter West PC LLO

(57) ABSTRACT

A method and system for selectively interconnecting two SCSI host buses where each SCSI host bus includes a host device and multiple addressable SCSI target devices, each SCSI target device having a multibit SCSI ID associated therewith. A SCSI cross-link repeater is interposed between the two SCSI host buses and selectively enabled. Each time the SCSI cross-link repeater is enabled, the repeater enable signal is utilized to automatically alter the most significant bit of the multibit SCSI ID associated with each SCSI target device on the second SCSI host bus, such that those SCSI target devices do not duplicate the SCSI IDs of the SCSI target devices on the first SCSI host bus. Disabling the SCSI cross-link repeater automatically resets the most significant bit of the multibit SCSI IDs, restoring the original SCSI IDs for those devices.

8 Claims, 3 Drawing Sheets

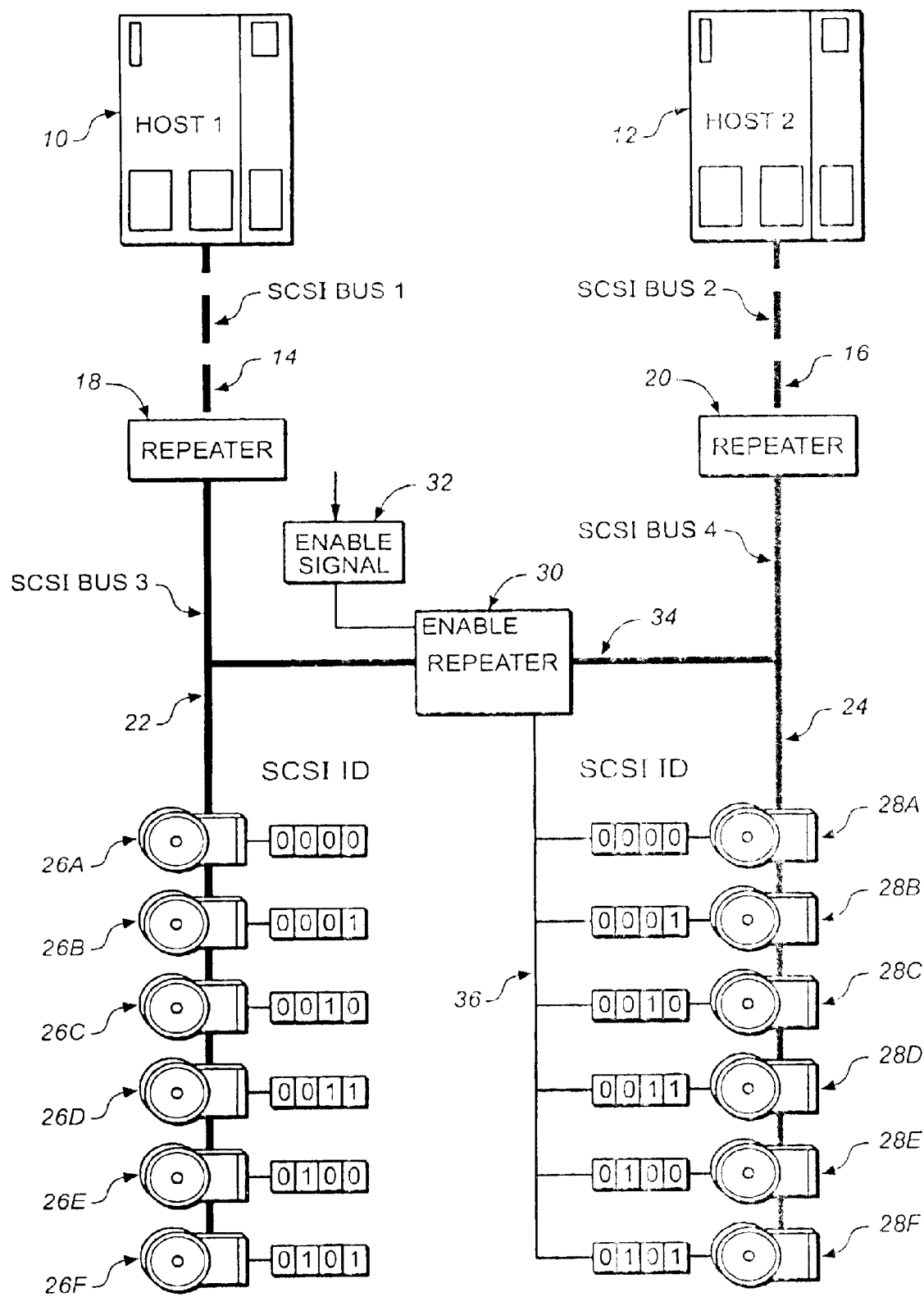
FIG._1

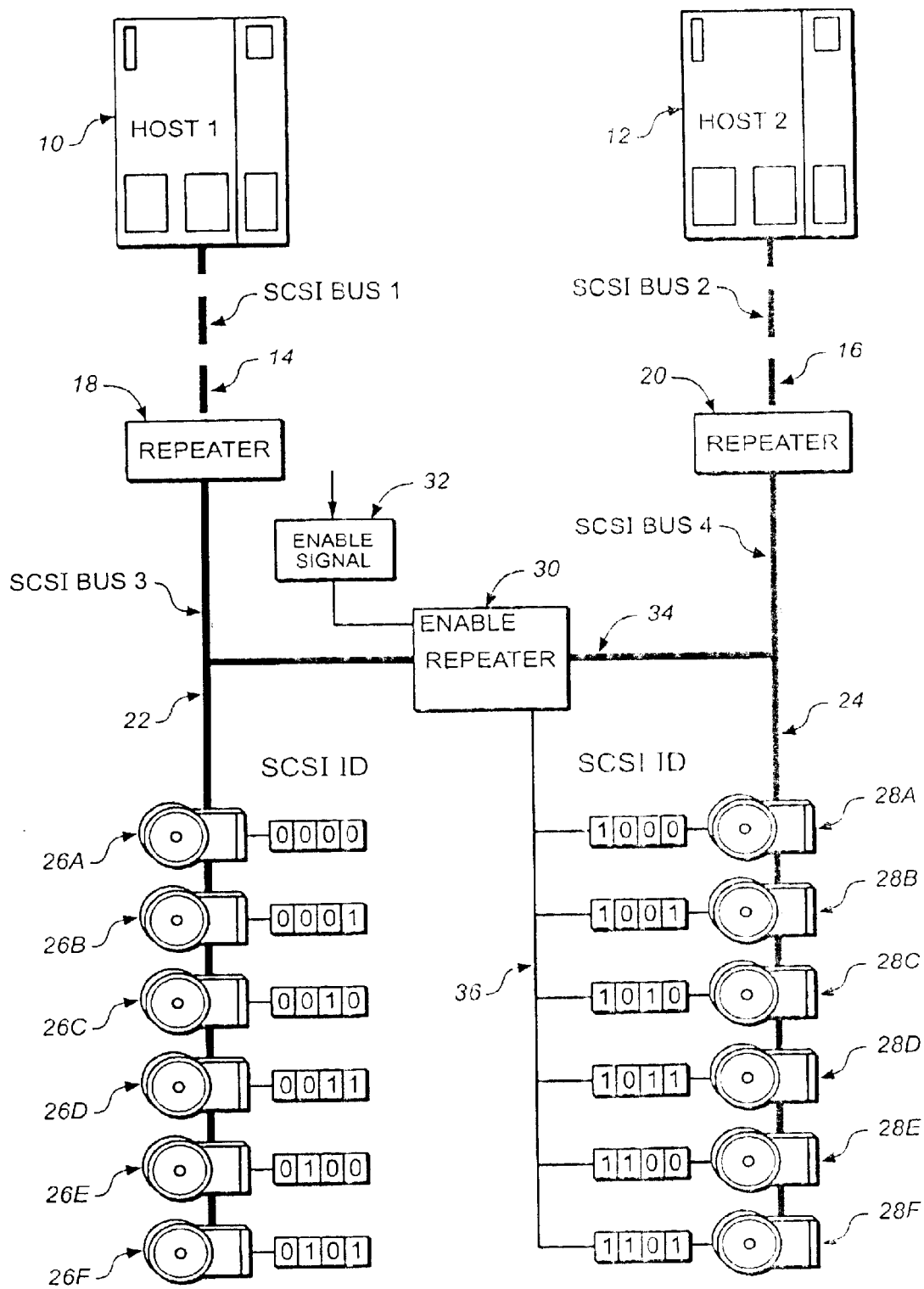
*FIG._2*

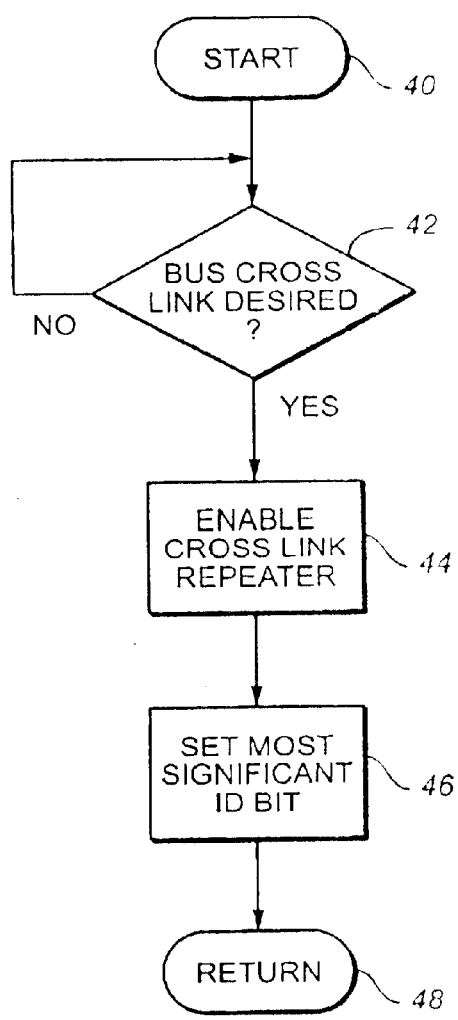
FIG._3
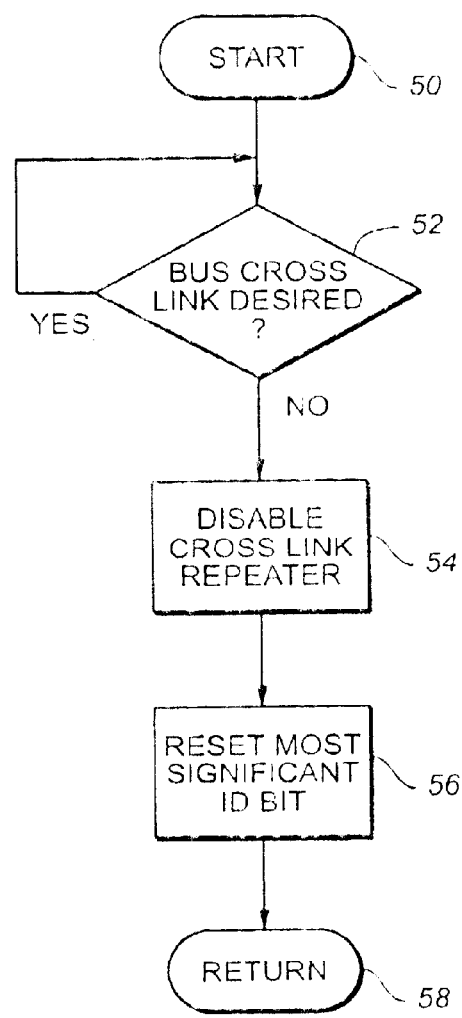
FIG._4

METHOD AND SYSTEM FOR SCSI HOST BUS INTERCONNECTION

BACKGROUND OF THE INVENTION

1. Technical Field

The present invention relates in general to an improved method and system for management of multiple storage devices coupled to a common bus and in particular to an improved method and system for interconnecting multiple small computer systems interface (SCSI) host buses. Still more particularly, the present invention relates to an improved method and system for automatically altering the SCSI IDs of each target device on a crosslinked bus in response to the cross linking such that no overlapping SCSI IDs result.

2. Description of the Related Art

The small computer systems interface (SCSI) is an American National Standards Institute (ANSI) standard communications bus that includes the electrical and logical protocol specification. The first version of SCSI, SCSI-1, defines a universal parallel, system-level interface for connecting up to eight devices along a single cable, called the SCSI bus. Parallel devices (such as the majority of printers) send a group of bits at one time, as opposed to serial devices which send data one bit at a time. As a system-level interface, SCSI is very different from a device-level interface such as the Enhanced Small Device Interface (ESDI) in that SCSI is an independent and intelligent local/I/O bus through which a variety of different devices in one or more controllers can communicate and exchange information independent of what the rest of the system is doing.

SCSI has become an industry standard and is typically utilized in the computer workstation environment. SCSI may also be utilized in the personal computer environment. SCSI has become the standard for peripherals, such as disk drives, tape drives, optical storage devices, printers, scanners, etc. Like all standards, SCSI is used in a large number of installed pieces of computer equipment. Users have invested considerable money in computers and peripherals which employ the SCSI bus.

With the constant increase in the performance/price ration of computer systems, the amount of data and the number of peripherals which may need to be accommodated by the SCSI bus have increased. The problem with this increase is that there are a limited number of devices which may be coupled to a SCSI bus. For example, SCSI-1 supports up to eight devices which are generally limited to a peak throughput of five megabytes per second. So-called Fast SCSI was introduced which permitted the synchronous transfer rate to double from rates possible with SCSI-1. Thereafter, so-called wide SCSI provided a bus which was increased in width from eight bits to either sixteen or thirty-two bits in order to move more data at a faster rate and accommodate a larger number of target devices. Finally, the Fast and Wide SCSI was created utilizing both the Wide bus and the faster transfer rate to provide even greater improvement in the performance of this bus.

According to the SCSI standard for SCSI-1 and SCSI-2 hardware, SCSI signals are required to be good for a total bus length of approximately six meters when travelling through SCSI compliant cables. Fast SCSI cuts the maximum cable length in half. As those skilled in the art will appreciate, as cables get longer, the signals weaken and are more susceptible to noise and if the length of a SCSI bus must be extended, it will be necessary to utilize a so-called repeater. A repeater picks up the signal from the host adapter and reproduces that signal on the next section of cable, thereby producing an enhanced signal for devices further down the bus.

Examples of bus repeaters may be found in U.S. Pat. No. 4,604,689, U.S. Pat. No. 5,615,345 and U.S. Pat. No. 5,495,584.

Despite the utilization of repeater devices the connecting of more than one SCSI host device to a peripheral device presents several problems which are nontrivial in nature. Primarily, daisy chaining multiple host devices together limits the length of cable for each host device in a maximum length for the particular bus technology divided by the number of hosts. Secondarily, each so-called "daisy chain" type connection may cause mismatches in electrical characteristics of the cabling and increase electrical noise within the system. Finally, the interconnection of multiple host buses may create a problem in that each target device on the host bus typically includes a SCSI bus ID number and care must be taken to ensure that each section of the bus does not include SCSI ID numbers which are duplicative of numbers in another section of the bus.

It should therefore be apparent that a need exists for a method and system for interconnecting multiple SCSI host buses in a manner which is efficient and manageable.

SUMMARY OF THE INVENTION

It is therefore one object of the present invention to provide an improved method and system for management of multiple storage devices coupled to a common bus.

It is another object of the present invention to provide an improved method and system for interconnecting multiple SCSI host buses.

It is yet another object of the present invention to provide an improved method and system for automatically altering the SCSI IDs of each target device on a crosslinked bus in response to the cross linking of those buses such that no overlapping SCSI IDs result.

The foregoing objects are achieved as is now described. A method and system are disclosed for selectively interconnecting two SCSI host buses where each SCSI host bus includes a host device and multiple addressable SCSI target devices, each SCSI target device having a multibit SCSI ID associated therewith. A SCSI cross-link repeater is interposed between the two SCSI host buses and selectively enabled. Each time the SCSI cross-link repeater is enabled, the repeater enable signal is utilized to automatically alter the most significant bit of the multibit SCSI ID associated with each SCSI target device on the second SCSI host bus, such that those SCSI target devices do not duplicate the SCSI IDs of the SCSI target devices on the first SCSI host bus. Disabling the SCSI cross-link repeater automatically resets the most significant bit of the multibit SCSI IDs, restoring the original SCSI IDs for those devices.

The above as well as additional objects, features, and advantages of the present invention will become apparent in the following detailed written description.

BRIEF DESCRIPTION OF THE DRAWINGS

The novel features believed characteristic of the invention are set forth in the appended claims. The invention itself however, as well as a preferred mode of use, further objects and advantages thereof, will best be understood by reference to the following detailed description of an illustrative embodiment when read in conjunction with the accompanying drawings, wherein:

FIG. 1 is a high level, partially schematic, block diagram of two SCSI host buses interconnected in accordance with the method and system of the present invention;

FIG. 2 is a high level, partially schematic, block diagram of the interconnected SCSI host buses of FIG. 1 demonstrating automatic SCSI ID alteration in accordance with the method and system of the present invention;

FIG. 3 is a high level logic flowchart illustrated in the process of cross linking two SCSI host buses in accordance with the method of the present invention; and FIG. 4 is a high level logic flowchart illustrating the process of unlinking two SCSI host buses in accordance with the method of the present invention.

DETAILED DESCRIPTION OF THE PREFERRED EMBODIMENT

With reference now to the figures and in particular with reference to FIG. 1, there is depicted a high level, partially schematic, block diagram of two SCSI host buses interconnected in accordance with the method and system of the present invention. As illustrated, a first host device 10 and a second host device 12 are each coupled to a respective SCSI bus 14 and 16. Multiple target devices may be present within SCSI bus 14 and SCSI bus 16 and those devices are not depicted within FIG. 1.

As is well known to those having ordinary skill in the art, the extension of a SCSI bus beyond a particular length requires the utilization of a repeater and repeater 18 and repeater 20 are each utilized to extend SCSI bus 14 and SCSI bus 16 as depicted. Each repeater 18 and 20 may be implemented utilizing any commercially available SCSI bus expander such as the SYM53C141 LVD SCSI bus expander available from LSI Logic Corporation.

Coupled to repeater 18 is an extended SCSI bus 22 to which are coupled multiple SCSI target devices 26A–26F. While a plurality of hard disk drives are schematically depicted within FIG. 1, those skilled in the art will appreciate that SCSI target devices 26A–26F may comprise any device capable of being utilized within a SCSI bus including, for example, tape backups, digital audio tape devices, optical drives, CD-ROM drives, printers and scanners.

As illustrated, associated with each SCSI target device 26A–26F a multi-bit SCSI ID and as illustrated, SCSI target devices 26A–26F are identified by four bit binary SCSI IDs ranging from 0–5 decimal.

Still referring to FIG. 1, a second SCSI bus 24 is coupled to repeater 20 and it similarly includes a plurality of SCSI target devices 28A–28F. As illustrated, each of these SCSI target devices also includes an associated multibit SCSI ID and as depicted, the SCSI IDs for SCSI target devices 28A–28F are also set to 0–5 decimal.

In accordance with an important feature of the present invention, SCSI bus 22 and SCSI bus 24 are interconnected via cross link SCSI bus 34 and cross link repeater 30. Cross link repeater 30 is preferably provided utilizing a well known bus repeater device such as the SYM53C120 Ultra SCSI Buddy manufactured by LSI Logic Corporation which may be selectively enabled to interconnect SCSI bus 22 and SCSI bus 24 via cross link SCSI bus 34.

Cross link repeater 30 may be selectively enabled by the provision of a logic one at a warm start enable input pin to cross link repeater 30. The warm start enable signal is preferably provided via enable signal generator 32. Enable signal generator 32 may be utilized to generate a logic one by the utilization of a manual switch or by the provision of an electrical signal generated by first host device 10, for example.

In accordance with an important feature of the present invention, the provision of a logical one at the warm start enable input pin of cross link repeater 30 results in that logical one being coupled to the most significant bit of each SCSI ID register associated with SCSI target devices 28A–28F via control line 36, as illustrated.

Referring now to FIG. 2, there is depicted a high level, partially schematic, block diagram of the interconnected SCSI host buses of FIG. 1, demonstrating automatic SCSI ID alteration in accordance with the method and system of the present invention. As depicted, the multibit SCSI ID for SCSI target devices 26A–26F remains set at 0–5 decimal inclusive but, in accordance with an important feature of the present invention, the most significant bit in each SCSI ID register of SCSI target devices 28A–28F has been set to a logical one, altering the SCSI ID for those devices to 8–13 decimal as depicted. In this manner, those having ordinary skill in the art will appreciate, SCSI target devices 28A–28F may be selectively cross linked to SCSI bus 22 for access by first host device 10 by automatically altering the SCSI ID of those devices such that no duplicate SCSI IDs are present within the combined bus.

With reference now to FIG. 3, there is depicted a high level logic flowchart illustrating the process of cross linking two SCSI host buses in accordance with the method of the present invention. As depicted, the process begins at block 40 and thereafter passes to block 42. Block 42 depicts an indication of whether or not bus cross linking is desired, and if not, this process merely iterates until such time as bus cross linking is desired. In the depicted example, the configuration for a plurality of SCSI buses may typically be set at the beginning of a work day in accordance with a signal generated by a host device or in response to the manual setting of an enable signal to cross link repeater 30 (See FIG. 1).

Still referring to block 42, in the event a bus cross link is desired, the process passes to block 44. Block 44 illustrates the enabling of the cross link repeater in response to either an electrical or physical signal as described above. Next, the process passes to block 46. Block 46 depicts the setting of the most significant ID bit within each associated register for SCSI target devices 28A–28F (See FIG. 1) in order to avoid duplication of SCSI IDs on the cross linked buses. Thereafter, the process passes to block 48 and returns.

Finally, referring to FIG. 4, there is depicted a high level logic flowchart illustrating the process of unlinking two SCSI host buses in accordance with the method of the present invention. As described above, this process also begins at block 50 and thereafter passes to block 52. Block 52 illustrates a determination of whether or not bus cross linking is desired, and if so, this process merely iterates as bus cross linking has been accomplished as described above.

Still referring to block 52, in the event bus cross linking is no longer desired, the process passes to block 54. Block 54 illustrates the disabling of cross link repeater 30 (see FIG. 1) by the removal of the electrical signal or the physical movement of a switch as described above. Thereafter, the process passes to block 56.

Block 56 illustrates the resetting of the most significant ID bit within each register associated with SCSI target devices 28A–28F and the SCSI IDs originally present within those devices are restored. Finally, the process passes to block 58 and returns.

Upon reference to the foregoing, those skilled in the art will appreciate that the Applicant has created a system in which multiple SCSI host buses may be selectively cross linked while ensuring that SCSI ID values remain unique for all devices coupled to a cross linked pair of SCSI buses.

While the invention has been particularly shown and described with reference to a preferred embodiment, it will be understood by those skilled in the art that various changes in form and detail may be made therein without departing from the spirit and scope of the invention.

What is claimed is:

1. A method for selectively interconnecting two SCSI host buses where each SCSI host bus includes a host device and a plurality of addressable SCSI devices each having a SCSI ID, said method comprising the steps of:

interposing a repeater between a first SCSI host bus and a second SCSI host bus;

selectively enabling the repeater; and automatically altering the SCSI ID of each SCSI device on the second SCSI host bus in response to the enabling of the repeater such that there are no overlapping SCSI IDs within the two combined SCSI host buses.

2. The method for selectively interconnecting two SCSI host buses according to claim 1, wherein each SCSI ID comprises a multibit ID and wherein the step of automatically altering the SCSI ID of each SCSI device on the second SCSI host bus in response to the enabling of the repeater comprises the step of automatically setting a most significant bit of the multibit ID of each SCSI device on the second SCSI host bus in response to the enabling of the repeater.

3. The method for selectively interconnecting two SCSI host buses according to claim 2, further including the step of resetting a most significant bit of the multibit ID of east SCSI device on the second SCSI host bus in response to the automatically resetting disabling of the repeater.

4. A system for selectively interconnecting two SCSI host buses where each SCSI host bus includes a host device and a plurality of addressable SCSI devices each having a SCSI ID, said system comprising the steps of:

a repeater interposed between a first SCSI host bus and a second SCSI host bus;

means for selectively enabling the repeater; and means for automatically altering the SCSI ID of each SCSI device on the second SCSI host bus in response to the enabling of the repeater such that there are no overlapping SCSI IDs within the two combined SCSI host buses.

5. The system for selectively interconnecting two SCSI host buses according to claim 4, wherein each SCSI ID comprises a multibit binary ID.

6. The system for selectively interconnecting two SCSI host buses according to claim 5, wherein said means for automatically altering the SCSI ID of each SCSI device on the second SCSI host bus in response to the enabling of the repeater comprises the step of automatically setting a most significant bit of the multibit binary ID of each SCSI device on a second SCSI host bus in response to the enabling of the repeater.

7. The system for selectively interconnecting two SCSI host buses according to claim 6, further including means for automatically resetting a most significant bit of the multibit binary ID of each SCSI device on the second SCSI host bus in response to the disabling of the repeater.

8. The system for selectively interconnecting two SCSI host buses according to claim 4, wherein each SCSI device comprises a hard disk drive.

* * * * *